Nov. 11, 1969   G. S. KIESTER ET AL   3,477,521
AUTOMATIC POWER TOOL

Filed Oct. 5, 1967   2 Sheets-Sheet 1

INVENTORS
GEORGE S. KIESTER
R STANFORD SHORT

BY *Bair, Freeman*
*& Molinare*
ATTORNEYS

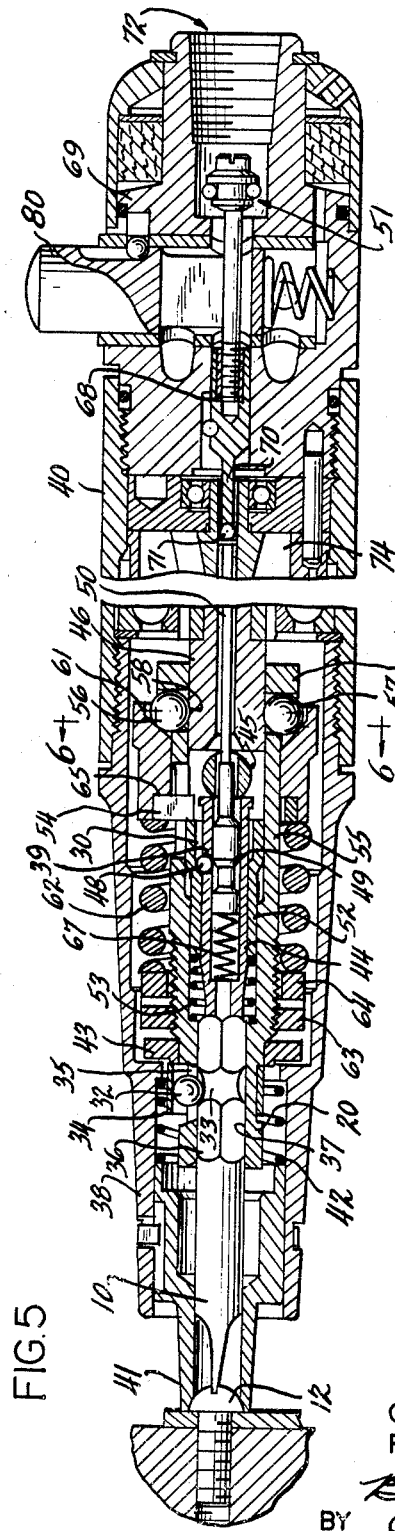
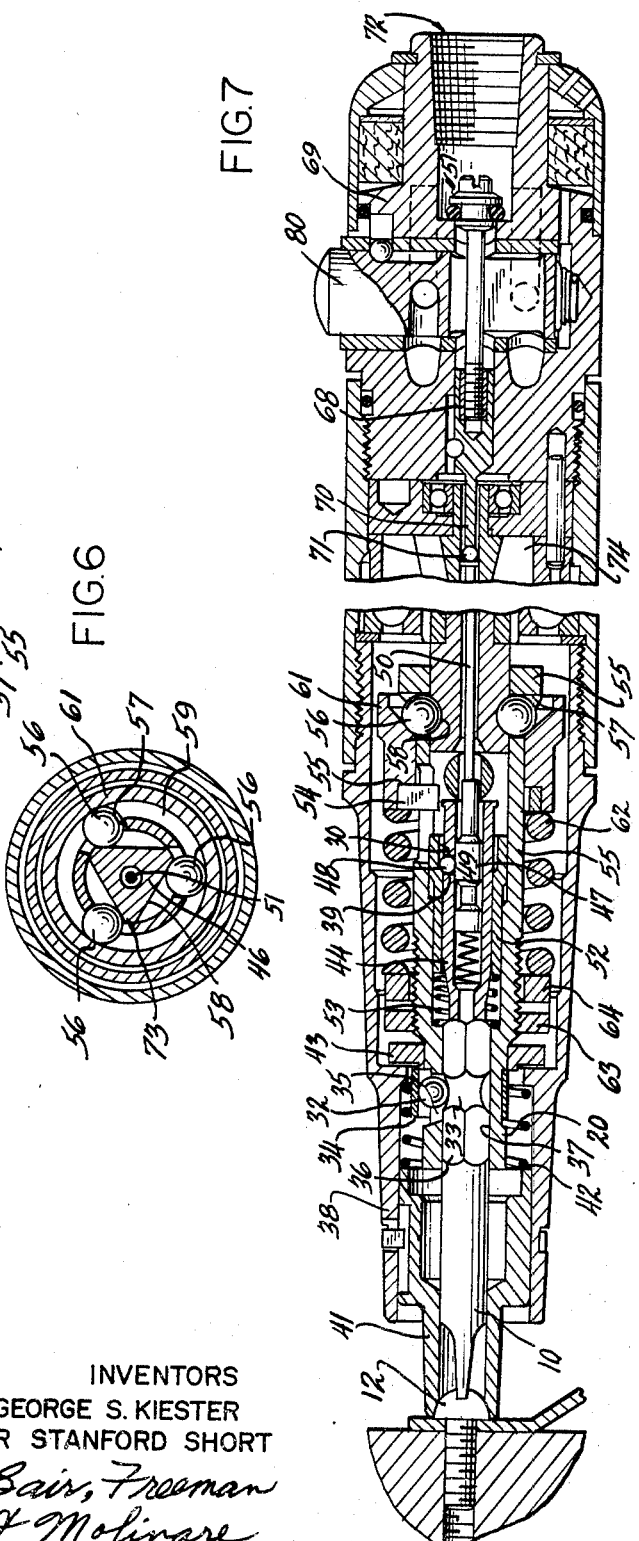
INVENTORS
GEORGE S. KIESTER
R STANFORD SHORT
BY *Bair, Freeman & Molinare*
ATTORNEYS

ABSTRACT OF THE DISCLOSURE

The specification discloses a comparatively simple automatic power tool that turns on by engagement with work to be driven, and which turns off upon a predetermined torque being attained. A novel clutch and power control assembly is provided in which a driver element driven by the motor has a plurality of cam surfaces or grooves formed therein, preferably three, which receive radially movable drive transfer balls which coact with an axially slidable follower element as well as a slotted driven element. The balls coact with a conical cam surface end of the follower, the opposite end of which engages a clip which actuates a sleeve mechanism containing a ball release assembly that operates to control the air supply to the motor in response to the torque applied to the implement portion of the tool.

---

This invention relates broadly to improvements in clutches and mechanisms controlling the supply and shut off or motive fluid to tools. More specifically, the invention is directed to clutch and on-off assemblies which are adapted for use in portable power-driven tools used for setting screws, nuts, bolts, and the like. One embodiment shown as exemplary of the clutch and on-off assembly of this invention is an automatic screw driver particularly designed for driving screws or the like into precision assembly components.

Heretofore such portable tools were equipped with a clutch mechanism including driving and driven members which have jaws axially movable into or out of operative engagement. Another class of clutches of which this invention is one, employ intermediate drive transfer members, such as ball bearings which move radially between a driving and driven member. These are the so-called rolling impulse clutches, examples of which are found in U.S. Patents 2,263,709; 2,882,704; 2,957,323; 2,964,151; and 2,986,052. The camming surfaces of a driver cam push the drive transfer balls radially outward, and the driver is free to rotate relative to the driven element. In a common form, vertices defined at the juncture of adjacent surfaces of a polygonal driver cam can pass under the balls. As the driver cam vertices rotate, a rolling force is imparted to the balls, hence the name "rolling impulse clutch." This rolling disengagement of the balls permits release of the driven element relative to the driver when the resistance to rotation of the tool implement reaches a predetermined maximum. In some of these examples, e.g. 2,263,709, the motor continues to operate although the driven tool implement portion of the device ceases its rotary motion in response to the frictional resistance imparted on it by the fastener that is being driven, and the ratchet like impacting sound signals the operator to remove the tool from the work.

In both 2,263,709 and 2,882,704, the clutch is used merely as an overload release mechanism and there is no motor control means in connection therewith. In U.S. Patents 2,957,323 and 3,005,325 such an overload release mechanism is used in combination with an axially movable jaw clutch. In the former patent the motor continues to run although the bit no longer imparts rotation to the work. The repeated impacting created by the passage of the vertices of the driver cam surfaces under the driving balls forcing them radially inwardly and outwardly is transmitted through the tool to the work as shock, and continued rotation wears the cam surfaces rapidly. The Patent 2,957,323 represents an advance over 2,263,709 insofar as engagement with the work actuates means for turning on the tool motor, rather than turning on being entirely independent, but the turning off in both was not automatic and must be operator controlled.

In both 2,964,151 and 2,986,052 there is provided automatic on and off actuating means in connection with a rolling impulse type clutch, but both require complex lever type mechanisms that are not simple of construction or maintenance. Further, the turning off of the motor is not actuated until the moment of or after the release and impacting of the drive transfer elements.

OBJECTS

Therefore, it is among the objects of this invention to provide a self-starting power operated tool, which will conserve the power supply by operating only when the tool is applied to the work.

It is another object of this invention to provide a clutch and power control assembly which actuates means for automatically stopping tool rotation upon the attainment of a predetermined torque by shutting off the motor which actuates the tool, and which thereby increases tool life since the motor and clutch parts are not continuously in operation.

It is another object of this invention to provide an adjustable, presettable torque responsive clutch of the type in which radially moving balls engage a driven element but which are not radially releasable from the driving element until after shut-off and thereby function to minimize wear of the clutch mechanism.

It is another object of this invention to provide a clutch assembly that may impart a single rolling impulse to drive transfer elements but only after release at a predetermined torque.

It is another object to provide a clutch assembly having fewer drive transfer elements which thus has less wear and is simpler and cheaper of construction.

It is still another object to provide means for automatically starting the motor of the tool as the operator applies the tool to the work with a minimum of force.

Other objects of our invention will appear from the detailed description which follows.

IN THE DRAWINGS

FIG. 5 is an enlarged longitudinal view partly in section through an automatic power tool embodying the clutch of our invention and showing the parts in a position just prior to shut-off when the torque of driving the fastener has just reached a predetermined maximum value;

FIG. 6 is a vertical view partly in section on line 6—6 of FIG. 5;

FIG. 7 is an enlarged longitudinal view partly in section through an automatic power tool embodying the clutch of our invention and showing the parts in the position when the torque from the driving of the fastener shuts off the motor of the tool, the reversing valve being in the position for reverse rotation operation.

SUMMARY

Figure 1:
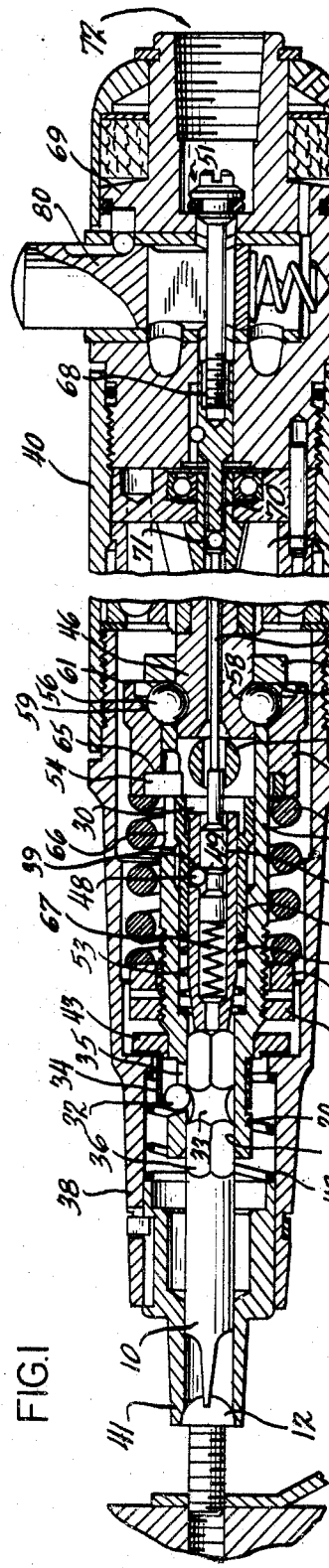
FIG. 1 is an enlarged longitudinal view partly in section through an automatic power tool embodying the clutch of our invention, and showing the parts in normal position just prior to sufficient axial force being applied to the tool by engagement with the work to be driven so that the motor commences to operate.

The objects of our invention are achieved by providing a novel clutch in which a driver element driven by the motor has a plurality of cam surfaces or grooves formed therein, preferably three, which receive radially movable driven transfer balls which coact with an axially slidable follower element as well as an apertured, preferably slotted, driven element. The balls coact with a conical cam surface end of the follower, the opposite end of which engages a clip which actuates a sleeve mechanism that operates to control the air supply to the motor in response to the torque applied to the implement portion of the tool. The drive transfer elements are in continuous engagement with the driver while the motor is on, and in one embodiment may be retained from travelling radially a sufficient distance to completely disengage by a lip portion of the follower element. Rolling impulse may be imparted to the drive transfer balls only after the motor is turned off and as a result of inertia, thus acting as a safety release. The details of the mechanism are more easily seen by reference to the accompanying drawings, in which like symbols designate corresponding parts throughout the several views.

DETAILED DESCRIPTION

Reference numeral 10 indicates a driven tool element such as a screw driver bit for the work, such as a screw 12. The bit 10 is removably held in a sleeve-like bit holder 20 which is an extension of a driven element of a clutch spindle 55. The bit 10 has a hexagonal portion 36 received in a hexagon socket 37 of the bit holder to impart rotation to the bit when the holder is rotated. The bit is held in the sleeve by means of a ball 32 in a slot 35 of the bit holder, the bit being provided with a groove 33 in the hexagon portion 36 for the ball, the ball being biased into the groove by a C-shaped leaf spring 34.

The bit 10 and the bit holder 20 are located within a housing 38 which is threaded into a housing 40 containing reduction gears and a pneumatic motor 74. Since the motor and gearing that may be used herein are of any conventional type, e.g., such as that shown in U.S. Patent 3,289,715, a detailed description is unnecessary. A particularly useful motor and valving assembly are shown and claimed in our co-pending application Serial No. 673,212 filed Oct. 5, 1967.

Figure 2:
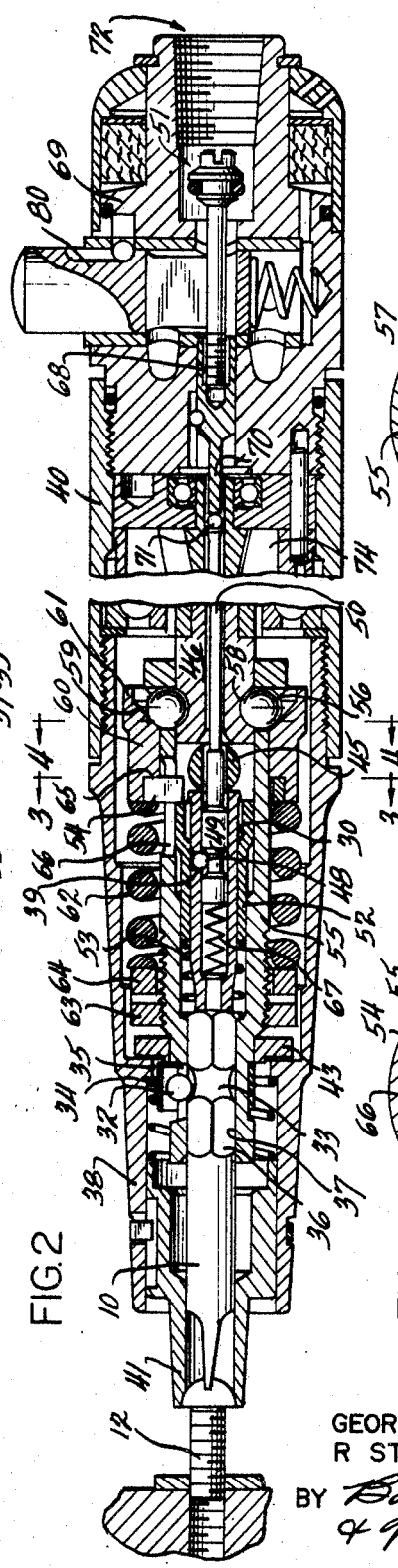
FIG. 2 is an enlarged longitudinal view partly in section through an automatic power tool embodying the clutch of our invention showing the parts in position when the motor and tool implement portion are in the operating position.
Figure 3:
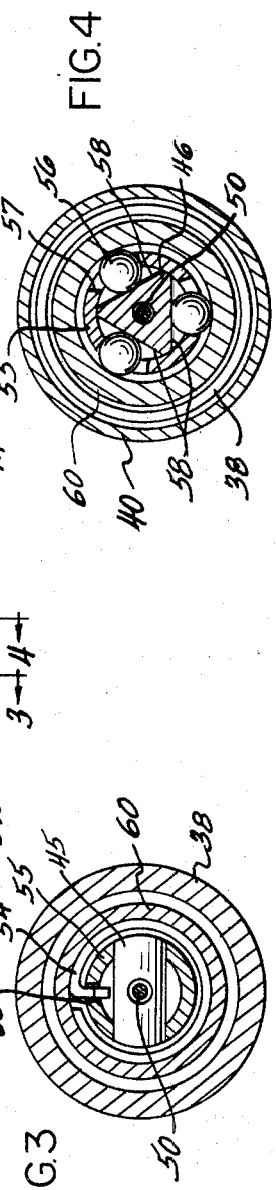
FIG. 3 is a vertical view partly in section on the line 3—3 of FIG. 2.

Within the forward end of the housing 38 (left hand end of FIG. 1) is slidably mounted a finder sleeve 41 backed by a spring 42 seated against a flange in the housing 38. Appreciable axial movement is permitted by the detent ball, slot, and spring retainer assembly 32, 35 and 34, and is needed to achieve the clutch function. A spacer 43 prevents the bit holder 20 from moving axially too far forward (to the left as seen in FIG. 1). Thrust applied to the working end of the bit 10 causes the bit to move axially, engaging and moving a thimble 44. A cross-piece stop 45 limits the axial movement of the thimble 44 as best seen in FIG. 2. This movement of the thimble 44 in turn causes rearward movement of a spool 47. A thimble ball 48 is confined in a hole 39 of the thimble 44 and is in contact with a camming surface 49 of a spool 47. Since the diameter of the ball 48 is larger than the annular thickness of the thimble 44, it will transfer axial movement to the spool 47 as long as it is radially outwardly confined. The spool 47 in turn moves a rod 50, a ball 71, and an extension 70 to open the throttle valve assembly 51 (FIG. 2) and turn on the motor 74 in housing 40. With the thimble 44 in this position, the thimble ball 48 is moved closer to a counter-bore 30 in the sleeve 52. The sleeve 52 is biased by a spring 53 to maintain contact of its right hand end with a clip 54 axially slidable in slot 66 in driver spindle 55 (FIGS. 2 and 3).

Figure 4:
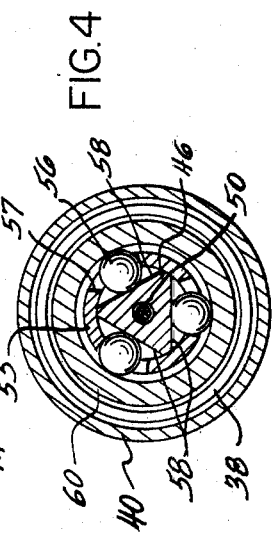
FIG. 4 is a vertical view partly in section on the line 4—4 of FIG. 2.

Rotation of bit 10 by the spindle 55 and thereby rotation of the screw 12 is achieved through the driving action of drive transfer balls 56 seated in slots 57 in the spindle. As can be seen best in FIG. 4, three drive transfer balls 56 coact with driver cam surfaces 58 formed on the driver 46. The cam surfaces are in the relationship to each other as sides of an equilateral triangle, but the ends of the cam surfaces do not meet to form apices. The three driving balls 56 are biased to seat on the triangular driver cam surfaces 58 by the attendant action of the conical cam surface 59 of follower sleeve 60 which in turn is biased by torque adjustment follower spring 62. The biasing force of follower spring 62 is adjustably preset by altering the compression of the spring, through the use of threaded nut 63 which is held in the adjusted position by lock washer 64.

The holes 57 in the spindle 55 may be round or, preferably, are in the form of a slot of arcuate length substantially greater than the diameter of a drive transfer ball 56. The arcuate slot permits rotational lost motion of the balls 56 as the follower returns to normal positions.

Referring now to FIGS. 5 and 6, when the bit 10 encounters a sufficient resistance to rotation, the torque imparted thereto causes relative rotation of the driver 46 with respect to the spindle 55. The rotation causes the driving balls 56 to be pushed radially outward by the driver cam surfaces 58. This radial movement of the driving balls 56 is translated to forward axial movement of the follower sleeve 60 by the conical cam surface 59. Forward movement of the follower sleeve 60 carries with it clip 54 which is axially retained within the follower sleeve 60 against the shoulder 65, as best seen in FIGS. 2 and 5. Slot 66 in spindle 55 permits of follower sleeve 60 with its retained clip 54 to move axially relative to spindle 55 to contact and move sleeve 52 in an axially forward direction, as best seen by comparing FIGS. 2, 3 and 5.

As best seen in FIG. 5, the movement of sleeve 52 against the sleeve bias spring 53 brings the counter-bore portion 30 of the sleeve into position over the radial opening 39 in thimble 44 containing the ball 48. Air pressure on the throttle valve assembly 51 is translated through rod 50 to the spool 47 in a forward direction. This forward bias on the spool 47, by the action of cam surface 49, urges the ball 48 radially outward in the hole 39 provided in thimble 44. When the counter-bore of sleeve 52 passes sufficiently over the hole in thimble 44, the ball 48 is forced completely out of the groove in spool 47 so that the spool will pass axially forwardly under the ball 48. When the ball 48 releases the spool 47, the air pressure acting on throttle valve assembly 51 overpowers the spool bias spring 67 thus permitting the throttle valve to close as in FIG. 7. When the throttle valve closes, motor 74 is immediately shut off and the rotation of the bit 10 ceases. Due to spring bias of the follower spring 62, both the clip 54 and the follower 60 immediately return to their normal positions as illustrated in FIG. 7. When the tool is removed from the work, that is, when the thrust against the bit 10 is released, the spool 47, thimble 44, ball 48 and sleeve 52 return to their normal positions shown in FIG. 1. In this normal position, it will be noted that ball 48 will be received in spool 47 ahead of its camming surface 49, and spring 53 will bias sleeve 52 axially rearwardly so that the counter-bore portion 30 of the sleeve will be moved out of a position overlying the hole 39 in thimble 44.

The follower sleeve 60 may be so dimensioned that the drive transfer balls 56 can ride over the driver tip 73, but the axial length of the follower sleeve 60 and other parts are so proportioned that the throttle valve shut-off assembly 51 is normally actuated to turn off the motor before the override occurs. The override can occur due to the inertia of the tool bit parts but transmittal of torque reaction to the operator is minimized. The shut-off response occurs before the balls pass over the vertices 73 and inertia alone causes the override. At low inertia conditions the balls remain in constant contact with the driver cam surfaces 58 while high energy conditions can and do result in the balls passing the vertices.

The throttle valve 51 is provided with a threaded shank portion 68 to permit adjustment and to compensate for tolerance and wear variations in the tool. The valve stem extension 70 is prevented from rotating by ball 71 making the adjustment easily accomplished by inserting a screw driver through the air inlet 72 in head 69 and turning the valve by the slot provided therein. The ball 71 located between the rod 50 and the throttle valve extension 70 also serves to provide a close clearance fit condition with the hole 75 through the rotor axis (FIG. 7). In this preferred construction, air leakage into the clutch cavity is thereby restricted.

No particular provision has been incorporated in the clutch assembly to insure rotational freedom of the follower sleeve 60 relative to the clip 54 which is prevented from rotation by the action of the depending prong against the sides of the slot 66 in spindle 55 (FIG. 3). In actual practice, however, the follower sleeve 60 does rotate with the clutch action, thus distributing wear from the action of the driving balls 56. This increases parts life and helps to maintain the accuracy of the clutch assembly.

The function of the shut off assembly, and more particularly of clip 54 and follower sleeve 60, can be achieved by alternate and equivalent part configurations or design. Within the spirit of the invention of the particular configuration illustrated is preferred for manufacturing simplicity.

The stop 45 is provided as a preferred construction to attain the optimum accuracy in operation of the clutch assembly. It is apparent that the end of the driver 46 could act as a stop means for the spool 47. However, the position of the end of the driver during operation is affected by the tolerance of many parts, and since not entirely predictable is insufficiently reliable.

As best seen in FIGS. 1, 2 and 7, the triangular cam surfaces on the driver are semicircular grooves shaped to be substantially interfitting with the drive transfer balls 56, rather than flat surfaces extending rearwardly to the forward axial end of the driver 46. By this provision of semicircular grooves on the order of size of the diameter of the driving balls, the service life of the driver cam surfaces 58 is increased since the stress area contacting the drive balls is far greater than a tangent flat surface contact. This groove construction also permits the driver to be made as a portion of a unitized clutch assembly construction.

As best seen in FIGS. 5 and 6, the optional lip 61 on follower sleeve 60 prevents the driving balls 56 from leaving spindle 55 should inertia cause sleeve 60 to travel forward beyond expectations.

The driver cam surfaces can be greater or fewer in number than three, or can intersect to form true triangular apices (in cross section), provided due consideration is given to achieve a functional assembly. But is it important that the inner diameter of the bore forming the follower lip 61 be more than the diameter of the driver 46 plus the diameter of two driving balls 56. Of course, it is also required that the axial length of the follower 60 be sufficient so that the clip 54 actuates the sleeve 52 to release the thimble ball 48 causing throttle valve 50 to close and shut off the motor before or upon the drive transfer balls reaching lip 61, at a given predetermined setting of nut 63.

Both uni-directional and reversible rotation construction can be utilized in this tool. It is preferred to utilize a reversible construction, as shown in the figures. Reversibility is achieved because the symmetry of the cylinder and motor end plates permits air to be valved to either side and exhausted from the other side by a reversing valve 80 in the head assembly 69. As seen in FIG. 7, when valve 80 is pushed down against its bias spring, the reverse porting is exposed for the air to pass in the direction opposite to that of FIG. 6, thus rotating the motor in the opposite direction. Uni-directional construction can be achieved by using a fixed plug to replace the reverse valve 80 and having fixed porting corresponding to that in FIG. 6. Alternatively, appropriately designed end plates and head construction could be employed to alter the porting pattern so that only a uni-directional rotation is imparted to the bit.

From the foregoing specification it is evident that we have provided a comparatively simple automatic tool that turns on by engagement with work to be driven, and which turns off upon a predetermined torque being attained. This is particularly desirable in connection with screws or the like for precision assembly components where an accurate torque control is necessary. Prior art devices utilizing rolling impulse clutches give rise to impacting when the vertices of the driver cam surfaces pass underneath the driving balls forcing them radially inwardly and outwardly in rapid oscillatory radial motion. This is transmitted through the tool to the work as shock. By the provision of our cammed ball clutch actuating a motor shutoff linkage the shock that develops from prior art impacting or ratcheting clutch jaws is entirely eliminated. Since the motor is immediately shut off the attendant reduction in wear provides a tool with a lengthened life.

We claim:
1. An automatic on-off tool of the character disclosed comprising:
 (a) means for rotating a driver,
 (b) a driver, one portion of which has a camming surface formed thereon,
 (c) a directly driven rotatable tool holder disposed externally coaxial to said driver, one end of which receives said camming surface portion of said driver, said end having means for receiving a drive transfer element therein,
 (d) a drive transfer element disposed in said receiving means of said tool holder in contact with said driver camming surface,
 (e) a generally tubular follower disposed exteriorly coaxially of said receiver end of said tool holder, said follower having a conical camming surface disposed to contact said drive transfer element,
 (f) a throttle valve assembly,
 (g) means for moving said throttle valve assembly, from an open position to a closed position, in contact with said follower, which includes:
  (i) means for effecting movement of said throttle valve to an open position in response to force of application of said tool to a work-piece to be driven,
  said opening means being releasably engageable with said throttle valve, and includes:
   (a) first means in responsive contact with said tool holder, said first means having a radially disposed aperture therein for receiving a ball, and
   (b) second means in contact with said throttle valve and having a ball receiving surface thereon, said second means being disposed coaxially and received within said first means,
   (c) a ball disposed in said aperture of said first means for contact with said receiving surface of said second means,

(ii) means for releasing said opening means from engagement with said throttle valve in response to axial movement of said follower, said releasing means being disposed coaxially and exteriorly around said first and said second means, and said releasing means includes a relieved portion therein, said second means and said releasing means are spring biased against said throttle valve and said follower respectively, said relieved portion of said releasing means providing space for movement of said ball when positioned over said aperture in said first means in response to predetermined axial movement of said follower, thereby to release said second means in response to motive fluid pressure on said throttle valve to close said valve, whereby said means for rotating said driver element is shut off when the torque developed in turning said tool holder exceeds a predetermined value.

2. A tool as in claim 1, wherein said drive transfer element is a ball, and said camming surface is in axial cross-section a portion of a circle whose diameter is slightly greater than said drive transfer ball.

3. A tool as in claim 1 wherein said driver has three camming surfaces formed thereon, said surfaces lying in a common plane perpendicular to the axis of said driver, and the ends of said surfaces are spaced from each other along the exterior surface of said driver.

4. A tool as in claim 3 wherein said drive transfer element is a ball, and said camming surface is in axial cross-section a portion of a circle substantially interfitting with said drive transfer ball.

5. A tool as in claim 1 wherein said follower includes a retaining lip portion formed as a continuation of the outermost periphery of said conical camming surface substantially parallel to the axis of said follower, thereby to retain said drive transfer elements in continuous radial contact with said driver cam surfaces.

6. A tool as in claim 5 wherein the inner diameter of a bore in said follower forming said lip is less than the diameter of said driver plus the diameter of two drive transfer elements.

7. A tool as in claim 1 wherein said drive transfer element is a ball and said means for receiving a drive transfer element in said tool holder end is a slot having an arcuate length substantially greater than the diameter of a drive transfer ball.

8. A tool as in claim 7 wherein said driver has three camming surfaces formed thereon, said surfaces lying in a common plane perpendicular to the axis of said driver, and the ends of said surfaces are spaced from each other along the exterior surface of said driver.

9. A tool as in claim 8 wherein each of said camming surfaces are in cross section a portion of a circle substantially interfitting with a drive transfer ball.

References Cited

UNITED STATES PATENTS

| | | | |
|---|---|---|---|
| 2,694,151 | 12/1960 | Eckman | 173—12 X |
| 3,205,992 | 9/1965 | Clapp | 192—150 |
| 3,288,258 | 11/1966 | Taylor | 192—150 |
| 3,289,715 | 12/1966 | DeGroff et al. | 192—150 X |

ERNEST R. PURSER, Primary Examiner

U.S. Cl. X.R.

91—59; 173—15